(12) United States Patent
Eriksson

(10) Patent No.: US 6,405,425 B1
(45) Date of Patent: Jun. 18, 2002

(54) FASTENING ASSEMBLY AND METHOD FOR FASTENING A MULTI-LAYERED LAMINATE TOGETHER

(75) Inventor: Ingvar Eriksson, Stockholm (SE)

(73) Assignee: Novator AB, Spanga (SE)

( * ) Notice: Subject to any disclaimer, the term of this patent is extended or adjusted under 35 U.S.C. 154(b) by 0 days.

(21) Appl. No.: 09/458,871

(22) Filed: Dec. 10, 1999

Related U.S. Application Data
(60) Provisional application No. 60/125,921, filed on Mar. 23, 1999, and provisional application No. 60/111,967, filed on Dec. 11, 1998.

(51) Int. Cl.$^7$ ............................. B21J 15/02; F16B 13/06
(52) U.S. Cl. ............................. 29/525.06; 29/525.02; 411/45; 411/55
(58) Field of Search ........................... 411/43, 45–48, 411/55, 69–71, 338, 339; 29/512, 524.1, 525.08, 325.02

(56) References Cited

U.S. PATENT DOCUMENTS

| | | | |
|---|---|---|---|
| 1,150,114 A | * | 8/1915 | Hays |
| 2,774,098 A | | 12/1956 | Tieri |
| 2,957,196 A | * | 10/1960 | Freider |
| 3,029,912 A | * | 4/1962 | Barker |
| 3,279,304 A | * | 10/1966 | Hopkins |
| 3,459,447 A | * | 8/1969 | Hurd |
| 3,693,247 A | * | 9/1972 | Brown |
| 3,702,088 A | * | 11/1972 | Schmitt |
| 4,447,944 A | * | 5/1984 | Mohrman |
| 4,907,925 A | * | 3/1990 | Self |
| 5,651,172 A | | 7/1997 | Auriol et al. |

FOREIGN PATENT DOCUMENTS

| | | |
|---|---|---|
| FR | 885 832 | 9/1943 |
| GB | 767675 | 2/1957 |

* cited by examiner

*Primary Examiner*—Flemming Saether
(74) *Attorney, Agent, or Firm*—Taylor & Aust, P.C.

(57) ABSTRACT

A fastener assembly is inserted into a throughhole of a composite laminate to thereby fasten the composite laminate together. The throughhole has a length extending from a first outer surface of the composite laminate to a second outer surface of the composite laminate. The throughhole has a first width at the first outer surface, a second width at the second outer surface, and a third width at a point along the length of the throughhole between the first outer surface and the second outer surface. The third width is less than each of the first width and the second width. The fastener assembly includes a substantially annular fastener device having an axial opening and a peripheral surface substantially conforming to the inner surface of the throughhole. An elongate element is tightly received within the axial opening of the fastener device and biases the peripheral surface of the fastener device against the inner surface of the throughhole such that both the fastener device and the elongate element are substantially entirely disposed between the first outer surface and the second outer surface of the composite laminate.

7 Claims, 3 Drawing Sheets

FASTENING ASSEMBLY AND METHOD FOR FASTENING A MULTI-LAYERED LAMINATE TOGETHER

CROSS REFERENCE TO RELATED APPLICATIONS

The application is based upon U.S. provisional patent application Ser. No. 60/111,967, entitled "FASTENING CONCEPTS FOR INCREASED STRENGTH AND FATIGUE LIFE IN AIRCRAFT STRUCTURES", filed Dec. 11, 1998, and U.S. provisional patent application Ser. No. 60/125,921, entitled "FASTENING CONCEPTS FOR INCREASED STRENGTH AND FATIGUE LIFE IN AIRCRAFT STRUCTURES, filed Mar. 23, 1999, the complete disclosures of which are hereby expressly incorporated by reference.

BACKGROUND OF THE INVENTION

1. Field of the Invention

The present invention relates to fastening devices, and, more particularly, to fastening devices for fastening a composite laminate together.

2. Description of the Related Art

Mechanical properties of graphite composites make them attractive for structural applications, such as in aircraft and spacecraft, where high strength and stiffness-to-weight ratios are required. In structural applications, composite components are often fastened to other structural components (composites or metals) by mechanical means. In bolted composite structures, stress concentrations develop around the holes, severely reducing the strength of the structure. The regions containing holes must, therefore, be reinforced, resulting in an overall weight increase. Overdesigned joints can easily reduce the weight savings which are possible through the use of composite materials. In order to realize the full potential of laminated composite materials as structural elements, the strength and failure characteristics of mechanically fastened joints must, therefore, be optimized.

The strength and fatigue life of bolted joints in composite (and metal) structures are affected by a large number of factors. In particular, factors such as type of fastener, fastener/hole tolerance and lateral constraint affect the strength and fatigue life. In critical joints in thick composite structures, the non-uniform contact stress distribution through the thickness reduces the static strength and fatigue life of the structure significantly. For aerodynamical reasons countersunk fasteners are often required. The countersink reduces the static strength and fatigue life of bolted joints as compared with joints that have protruding head fasteners. The reason is due to several factors such as an unevenly distributed contact stress and low clamping force.

It is known for fasteners and fastener holes in aircraft structures to be cylindrical or cylindrical in combination with a conical countersink. Previously, it has been difficult in a production environment to machine a hole in an aircraft structure such that the hole has a complex geometry, i.e., such that an inner surface of the hole is curved or parabolic along its length. Because of this machining difficulty, complex fastener and hole geometries have not been previously used.

A bolted structure 10 (FIG. 1) is fastened by a known fastener 12 which may be protruding or countersunk. Fastener 12 is used to join plates 14 and transfer the load from one member to the other by shear forces in bolt 16. As the joint is loaded, bolt 16 bends and tilts in hole 18 causing, a stress concentration through the thickness, which may significantly reduce the strength of the laminate. For optimum fatigue performance it is important to have an interference fit between fastener 12 and hole 18. A special problem when using interference fit fasteners in laminated composite materials is the risk for damaging the laminate when installing the fastener in the hole.

A severe disadvantage of existing aerospace fastener systems is the need for nuts or collars at the exit side of the hole or anchorage of the fastener. FIG. 3 shows a Hucktite type of lock bolt installed in a composite laminate. The parts of the fastener used for anchorage (shank and collar) represent a significant amount of the weight of the fastener. Moreover, the need for collars makes installation of blind rivets difficult in composite materials since the collar may cause damage to the composite material in the installation process. This is a well-known problem in the aircraft industry.

What is needed in the art is a fastening device and technique which reduces the nonuniform stress concentration through the thickness of a laminate to be fastened, and which makes it possible to install the fastening device with a well defined interference fit in both composites and metals without risking to damage the material.

SUMMARY OF THE INVENTION

The present invention provides a fastening device and method that increases the static strength and fatigue life of composite (and metal) structures, saves weight and facilitates automatic fastener installation, thereby increasing productivity.

The invention comprises, in one form thereof, a fastener assembly which is inserted into a throughhole of a composite laminate to thereby fasten the composite laminate together. The throughhole has a length extending from a first outer surface of the composite laminate to a second outer surface of the composite laminate. The throughhole has a first width at the first outer surface, a second width at the second outer surface, and a third width at a point along the length of the throughhole between the first outer surface and the second outer surface. The third width is less than each of the first width and the second width. The fastener assembly includes a substantially annular fastener device having an axial opening and a peripheral surface substantially conforming to the inner surface of the throughhole. An elongate element is tightly received within the axial opening of the fastener device and biases the peripheral surface of the fastener device against the inner surface of the throughhole such that both the fastener device and the elongate element are substantially entirely disposed between the first outer surface and the second outer surface of the composite laminate.

An advantage of the present invention is that a well defined interference fit is provided between the fastener device and the throughhole in the laminate.

Another advantage is that the stress concentration through the thickness of the laminate is minimized.

Yet another advantage is that the weight of the fastener assembly is less than that of known fasteners.

A further advantage is that the fastener can be easily installed in the throughhole of the laminate using an automated assembly process.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

It is now possible, using automated high speed machining techniques, to cost effectively machine high precision straight diameter and conical countersinks. Such techniques allow the machining of complex fastener hole geometries without increasing tool cost or machining time. Hence, it is now possible to implement such machine tools in production environments. Such techniques can be used for machining holes in critical structures, thereby providing significant advantages with regard to strength, fatigue life, weight savings, and productivity.

Figure 1:
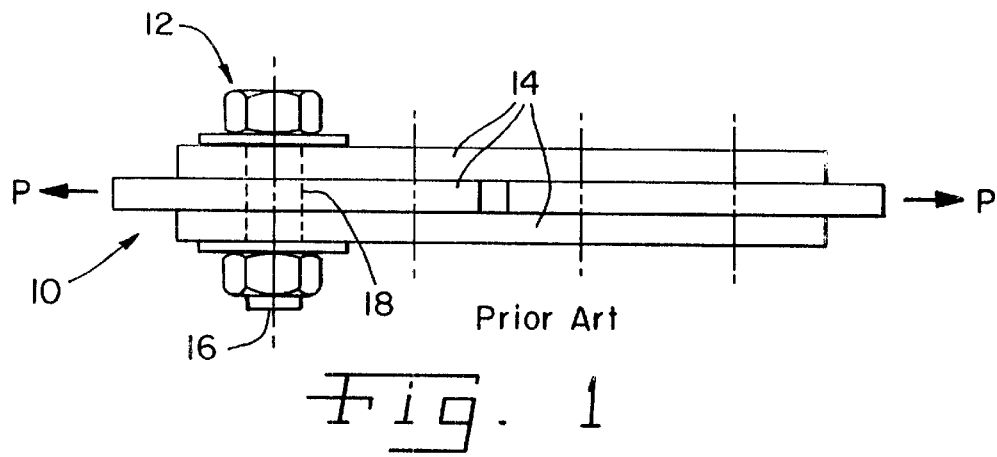
FIG. 1 is a side view of plates fastened together by a known fastener.
Figure 2A:
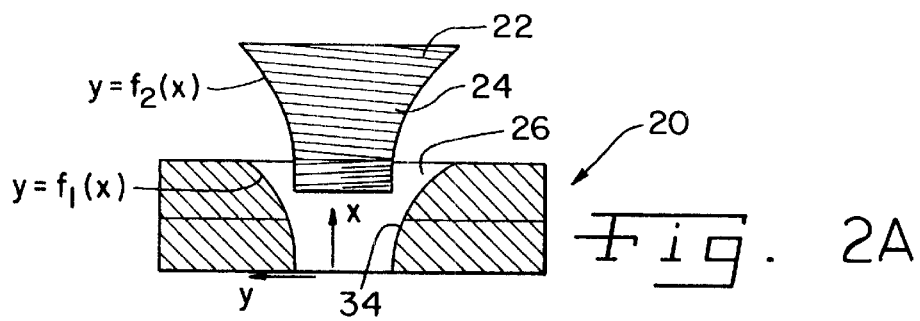
FIGS. 2(a)–(c) illustrate the steps of installing one embodiment of a fastener assembly of the present invention in a throughhole of a laminate.
Figure 2B:
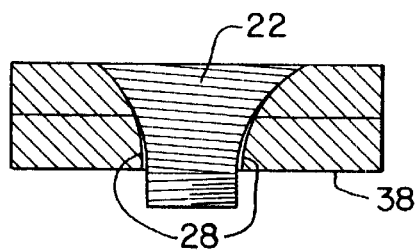
Figure 2C:
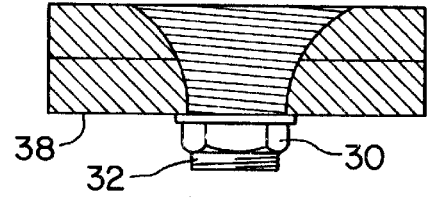
Figure 3:
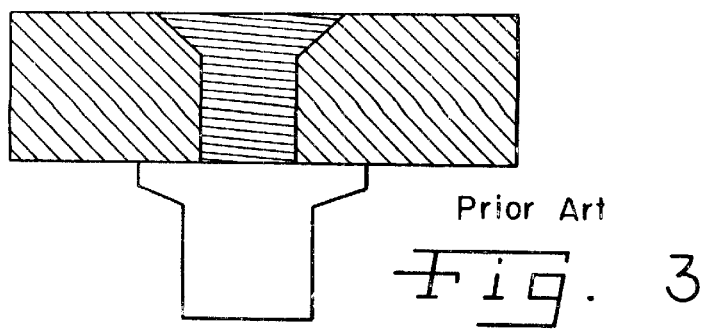
FIG. 3 is a side, partially sectional view of another known fastener.

A multi-layered laminate such as a composite laminate 20 (FIG. 2a) is fastened by a fastener 22 with a complex shaped shank 24. The shank geometry is defined by the function y=f$_2$(x). Fastener 22 is installed into a hole 26 with a complex shaped hole edge geometry defined by the function y=f$_1$(x), wherein the second derivative of y is positive for any value of x. That is, the diameter of hole 26 increases at an increasing rate in direction x. Fastener 22 is tightened to secure a well defined interference fit and a desirable pre-stress distribution in the material. The geometries of fastener 22 and of hole 26 increase the strength and fatigue life of the joint as compared to known fasteners. FIG. 2b shows the untightened fastener 22 installed in hole 26. A certain prescribed clearance 28, which is of exaggerated size in FIG. 2b for purposes of illustration, exists between fastener 22 and an inner surface 34 of hole 26. When fastener 22 is tightened by coupling an internally threaded collar 30 with threads 32 on shank 24, an interference fit is provided between fastener 22 and hole 26. Thus, the shapes of shank 24 and of inner surface 34 of hole 26 are optimized such that stress concentration through the thickness of fastener 22 is reduced or eliminated. A well defined interference fit between fastener 22 and hole 26 is provided by tightening collar 30 such that collar 30 exerts a force on an outer surface 38 of laminate 20, thereby biasing fastener 22 in hole 26. Strength and fatigue life of a typical joint can be substantially improved by using the suggested approach.

Figure 4A:
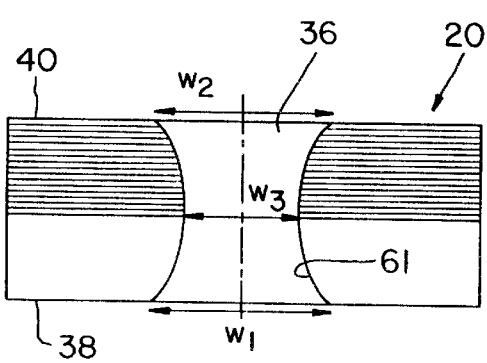
FIGS. 4(a)–(d) illustrate the steps of installing another embodiment of a fastener assembly of the present invention in a throughhole of a laminate.
Figure 4B:
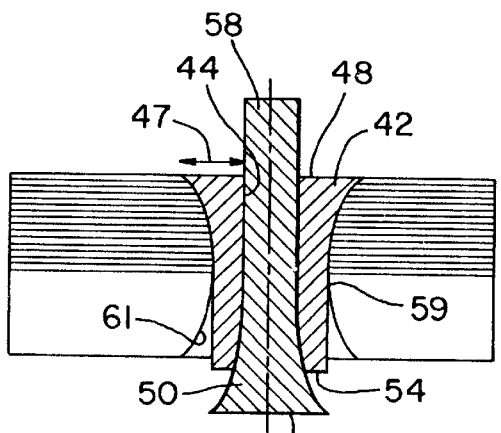
Figure 4C:
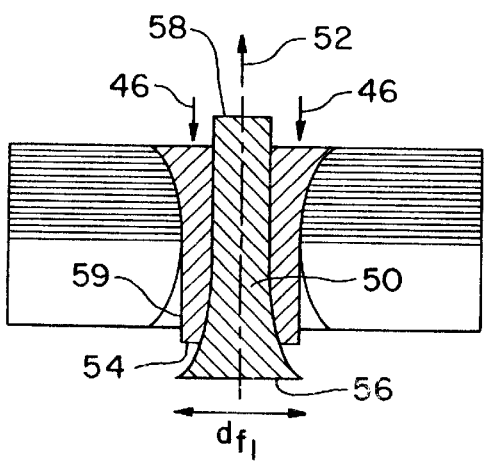

Orbital hole machining makes it possible to machine complex shaped holes such as the convexly shaped hole 36 shown in FIG. 4a. A width w$_3$, near a mid-point of hole 36 is substantially less than widths w$_1$ and w$_2$ of hole 36 at respective outer surfaces 38 and 40 of composite laminate 20. An annular blind fastener 42 (FIG. 4b) having a through channel 44 is installed in hole 36 by pushing fastener 42 in the direction indicated by arrows 46 (FIG. 4c) until fastener 42 is entirely disposed to one side of outer surface 40 of laminate 20. As is evident from the drawings, a wall thickness 47 of fastener 42 is at a maximum at outer surface 40 and tapers down in accordance with the decreasing width of hole 36. Thus, fastener 42 can be inserted into hole 36 until an axial surface 48 of fastener 42 is substantially flush or coplanar with outer surface 40, but fastener 42 cannot be pushed entirely through throughhole 36.

Figure 4D:
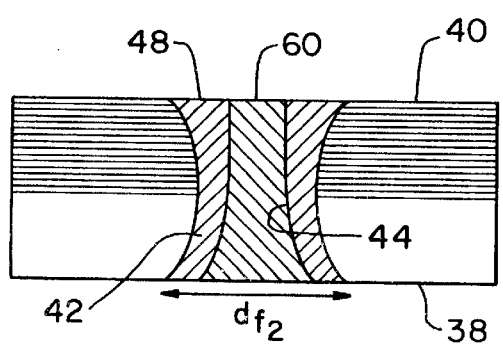

An elongate expanding rod 50 is pulled through through channel 44 in the direction indicated by arrow 52. As best seen in a comparison of FIGS. 4c and 4d, due to the plasticity or flexibility of fastener 42, a width or diameter of an opposite axial surface 54 of fastener 42 increases from d$_{f1}$ to d$_{f2}$ as expanding rod 50 is pulled into through channel 44. Similarly to the insertion of fastener 42 into through hole 36, expanding rod 50 can be inserted into through channel 44 until an axial surface 56 of expanding rod 50 is substantially flush or coplanar with both axial surface 54 of fastener 42 and outer surface 38. A width or diameter of expanding rod 50 is at a maximum at outer surface 38 and tapers down such that expanding rod 50 cannot be pushed entirely through through channel 44. Expanding rod 50 is tightly received within through channel 44 and biases a peripheral surface 59 of fastener 42 against inner surface 61 of throughhole 36. As a final step, an end 58 of expanding rod 50 is cut or otherwise machined off such that a resulting machined surface 60 of expanding rod 50 is substantially flush or coplanar with each of axial surface 48 of fastener 42 and outer surface 40.

Figure 5A:
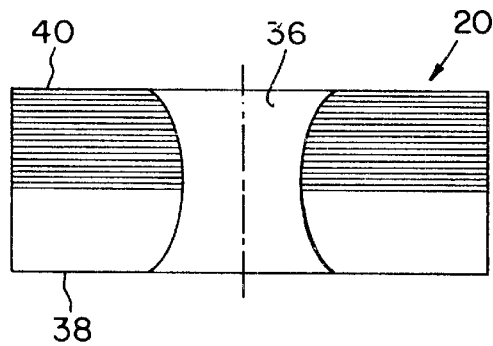
FIGS. 5(a)–(d) illustrate the steps of installing yet another embodiment of a fastener assembly of the present invention in a throughhole of a laminate.
Figure 5B:
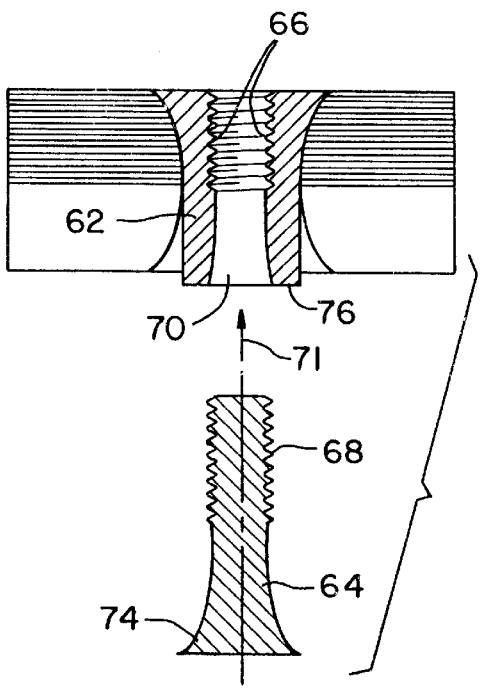
Figure 5C:
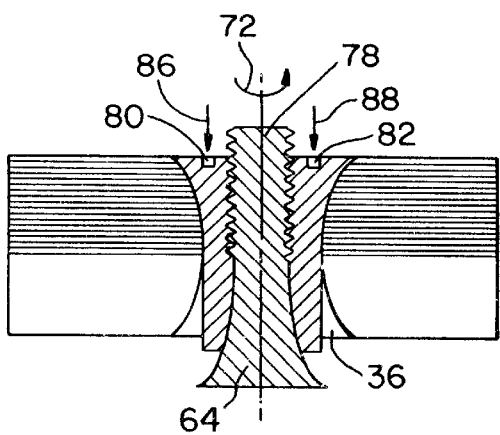

FIGS. 5a–5d illustrate another embodiment of the method of the present invention for fastening a composite laminate 20 together. In contrast with the fastener assembly shown in FIG. 4 wherein expanding rod 50 is pulled axially through blind fastener 42 to radially expand blind fastener 42, the embodiment in FIG. 5 includes a blind fastener 62 and an expanding rod 64 which include internal threads 66 and external threads 68, respectively. The internally threaded blind fastener 62 is placed into the complex shaped hole 36 in composite laminate 20 (FIG. 5b). Expanding rod 64 is then inserted into through channel 70 of blind fastener 62, as indicated by arrow 71, and threadingly engaged with blind fastener 62. Rotational movement, indicated by arrow 72, of expanding rod 64 in turn causes relative axial movement between blind fastener 62 and expanding rod 64 in the direction of arrow 71 (FIG. 5c). Blind fastener 62 is selected with a material type and configuration (e.g., wall thickness) which allows deformation of blind fastener 62 as shown.

Of course, it will be appreciated that the expanding rod may first be threadingly engaged with the blind fastener, and thereafter installed as an assembly in the hole in the composite laminate. Preassembly of the expanding rod and blind fastener allows the assembly to be inserted and attached from one side of the composite laminate.

Figure 5D:
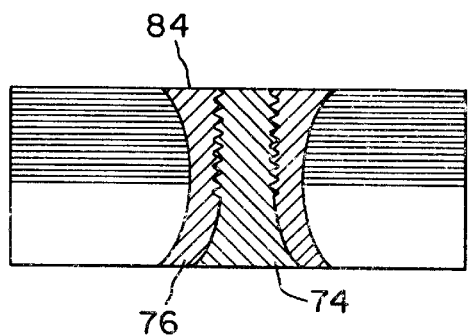

A flared end 74 on expanding rod 64 causes end 76 of blind fastener 62 to radially expand and fill the complex shaped hole 36 (FIG. 5d). An end 78 of expanding rod 64 is then machined off flush so that the fastener assembly is substantially coplanar with opposite sides 38 and 40 of composite laminate 20.

Figure 6:
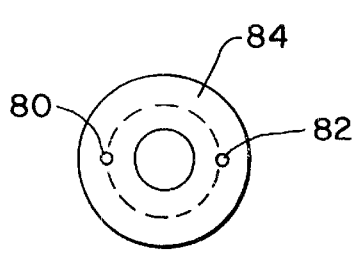
FIG. 6 is a top view of the fastener assembly of FIGS. 5(a)–(d).

Blind fastener 62 may be held stationary so that expanding rod 64 can be threaded therein to radially expand blind fastener 62. For example, blind fastener 62 may be provided with two recesses 80 and 82 (FIG. 6) in an axial surface 84 thereof which allow corresponding projections (not shown) to be placed therein, as indicated by arrows 86 and 88, to prevent blind fastener 62 from rotating during assembly.

Alternatively, the expanding rod may be configured in any suitable manner (such as with a specific projection or recess) allowing the expanding rod to be rotatably driven into the blind fastener. For certain applications, it may also be possible to rotatably drive the blind fastener while holding the expanding rod in a stationary position. It will be appreciated that the extent to which blind fastener 62 and expanding rod 64 in FIG. 5 are threaded, and the particular pitch of the threads, may vary depending upon the specific application.

The method and fastener assembly of the present invention have been illustrated herein in conjunction with throughholes having particular complex shaped geometries. However, it is to be understood that the method and fastening assembly of the present invention can also be used with hole geometries other than the ones shown herein. Moreover, the method and fastener assembly of the present invention have been illustrated herein in conjunction with throughholes in composite laminates. However the method and fastener assembly of the present invention can also be used with throughholes in metal laminates.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of fastening a multi-layered laminate together, said method comprising the steps of:
    orbital hole machining a throughhole in the laminate, the throughhole having a length extending from a first outer surface of the laminate to a second outer surface of the laminate, the throughhole having a first width at the first outer surface, a second width at the second outer surface, and a third width at a point along the length of the throughhole between the first outer surface and the second outer surface, the third width being less than each of the first width and the second width;
    inserting a substantially annular fastener device into the throughhole through the second outer surface of the laminate such that a first axial end of said fastener device is adjacent to the first outer surface and a second axial end of said fastener device is adjacent to the second outer surface of the laminate, said first axial end of said fastener device having an axial opening;
    placing an elongate element into said axial opening of said fastener device before said inserting step;
    biasing a peripheral surface of said fastener device against an inner surface of the throughhole in the laminate; and
    passing said elongate element through said axial opening until both said fastener device and said elongate element are substantially entirely disposed to one side of the first outer surface of the laminate.

2. The method of claim 1, wherein said passing step includes increasing a diameter of said fastener device.

3. The method of claim 1, wherein said elongate element is at least partially disposed within said axial opening of said fastener device during said inserting step.

4. A method of fastening a multi-layered laminate together, said method comprising the steps of:
    machining a throughhole in the laminate, the throughhole having a length extending from a first outer surface of the laminate to a second outer surface of the laminate, the throughhole having a first width at the first outer surface, a second width at the second outer surface, and a third width at a point along the length of the throughhole between the first outer surface and the second outer surface, the third width being less than each of the first width and the second width;
    providing a substantially annular fastener device with:
        a first axial end having an axial opening;
        a second axial end; and
        a plurality of internal threads facing said axial opening;
    inserting said fastener device into the throughhole through the second outer surface of the laminate such that the first axial end of said fastener device is adjacent to the first outer surface and the second axial end of said fastener device is adjacent to the second outer surface of the laminate;
    providing an elongate element with a plurality of external threads;
    placing said elongate element into said axial opening of said fastener device before said inserting step;
    biasing a peripheral surface of said fastener device against an inner surface of the throughhole in the laminate; and
    passing said elongate element through said axial opening until both said fastener device and said elongate element are substantially entirely disposed to one side of the first outer surface of the laminate, said passing step including screwing said elongate element into said fastener device.

5. The method of claim 4, wherein said screwing step includes holding said fastener device stationary while rotating said elongate element.

6. The method of claim 5, comprising the further step of providing an axial face of said fastener device with at least one recess, said holding step including inserting a manufacturing tool into said at least one recess.

7. A method of fastening a multi-layered laminate together, said method comprising the steps of:
    machining a throughhole in the laminate, the throughhole having a length extending from a first outer surface of the laminate to a second outer surface of the laminate, the throughhole having a first width at the first outer surface, a second width at the second outer surface, and a third width at a point along the length of the throughhole between the first outer surface and the second outer surface, the third width being less than each of the first width and the second width;
    inserting a substantially annular fastener device into the throughhole through the second outer surface of the laminate such that a first axial end of said fastener device is adjacent to the first outer surface and a second axial end of said fastener device is adjacent to the second outer surface of the laminate, said first axial end of said fastener device having an axial opening;
    placing an elongate element into said axial opening of said fastener device before said inserting step;

biasing a peripheral surface of said fastener device against an inner surface of the throughhole in the laminate;

passing said elongate element through said axial opening until both said fastener device and said elongate element are substantially entirely disposed to one side of the first outer surface of the laminate; and machining off an end of said elongate element such that a resulting machined surface of said elongate element is substantially flush with the second outer surface of the laminate.

* * * * *